(12) United States Patent
Perry

(10) Patent No.: US 8,146,261 B1
(45) Date of Patent: Apr. 3, 2012

(54) FISH MEASURING SYSTEM

(76) Inventor: Charles L. Perry, New Port Richey, FL (US)

( * ) Notice: Subject to any disclaimer, the term of this patent is extended or adjusted under 35 U.S.C. 154(b) by 0 days.

(21) Appl. No.: 13/066,773

(22) Filed: Apr. 25, 2011

(51) Int. Cl.
*G01B 5/02* (2006.01)

(52) U.S. Cl. .......................................... 33/511

(58) Field of Classification Search ............ 33/511, 33/512

See application file for complete search history.

(56) References Cited

U.S. PATENT DOCUMENTS

| | | | |
|---|---|---|---|
| 5,619,804 A * | 4/1997 | Vogt et al. ................. | 33/512 |
| 5,637,838 A * | 6/1997 | Arey et al. ................ | 33/511 |
| 6,253,459 B1 * | 7/2001 | Barnhill .................... | 33/514.1 |
| 6,765,155 B1 * | 7/2004 | Gray ......................... | 33/511 |
| 6,817,110 B2 * | 11/2004 | Bohnengel .................. | 33/555.4 |
| 7,412,794 B2 * | 8/2008 | Smith ........................ | 33/511 |
| 2002/0184779 A1 * | 12/2002 | Bohnengel .................. | 33/555.4 |

* cited by examiner

*Primary Examiner* — Yaritza Guadalupe-McCall

(57) ABSTRACT

A girth measurer includes a generally tubular elongated body with interior and exterior ends. The girth measurer includes a handle at the interior end. The girth measurer also includes a generally triangular guide at the exterior end. The guide has two upper slots and two lower slots. A slider is reciprocally mounted for movement within the body. A strap is fabricated of a flexible, inextensible material. The strap has first and second ends passing downwardly through the slots and attached to the slider. The strap is in two parallel sections between the triangular guide and the handle. The strap is in a closed loop between the two upper slots. The loop is of varying circumferences as a function of the position of the handle along the body.

6 Claims, 3 Drawing Sheets

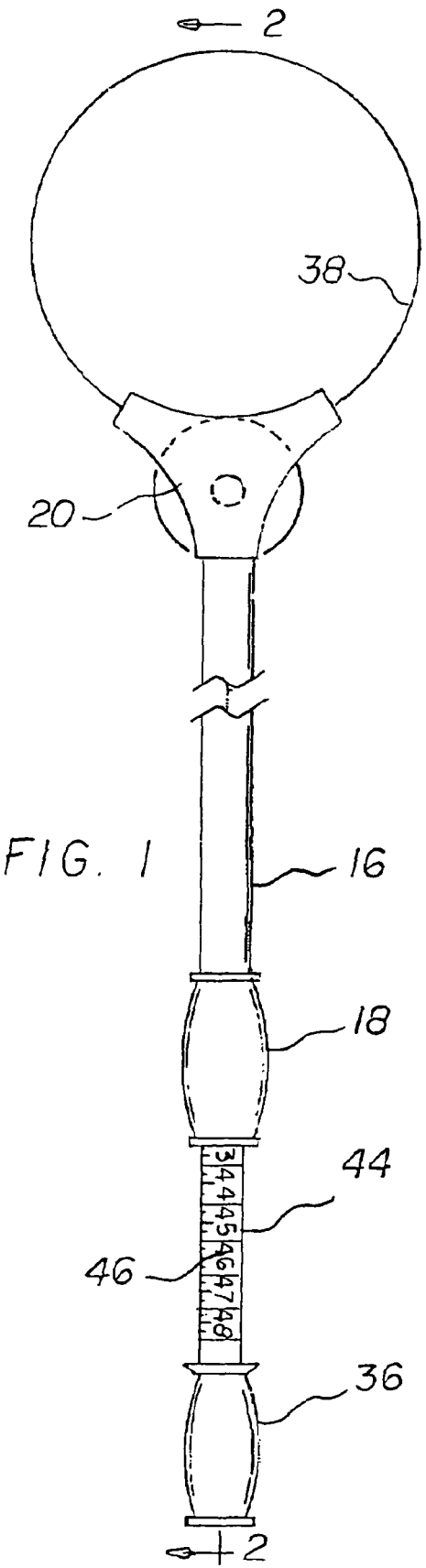
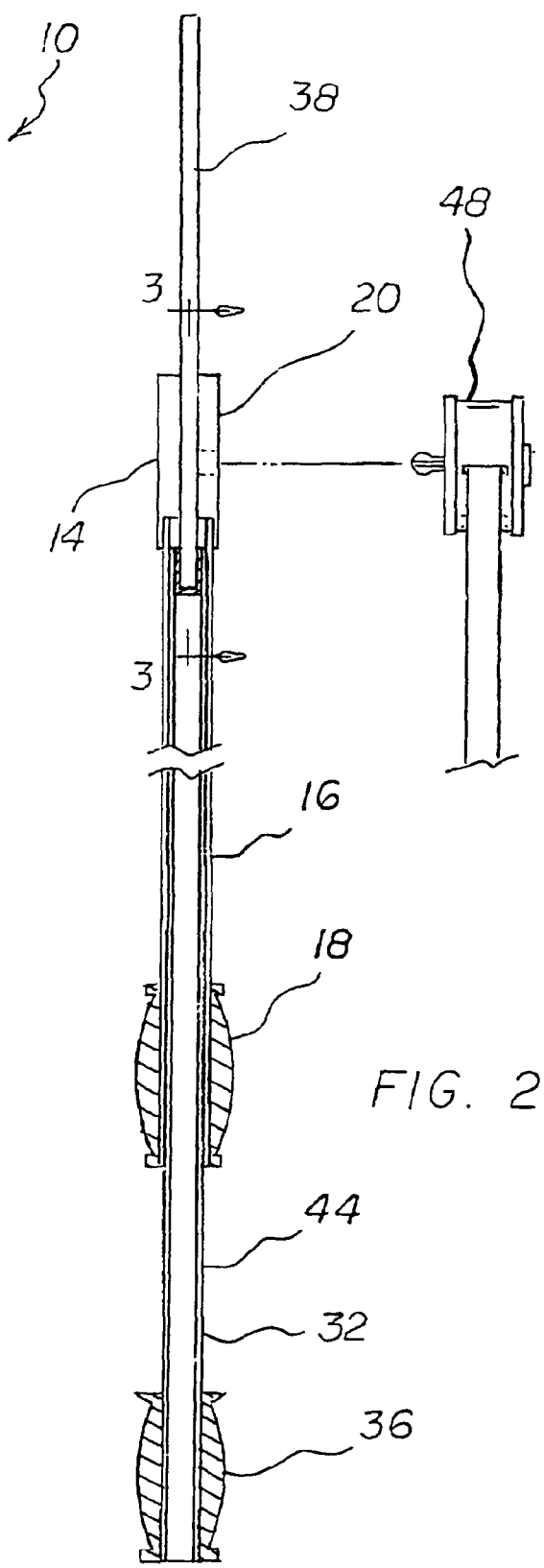
FIG. 1
FIG. 2

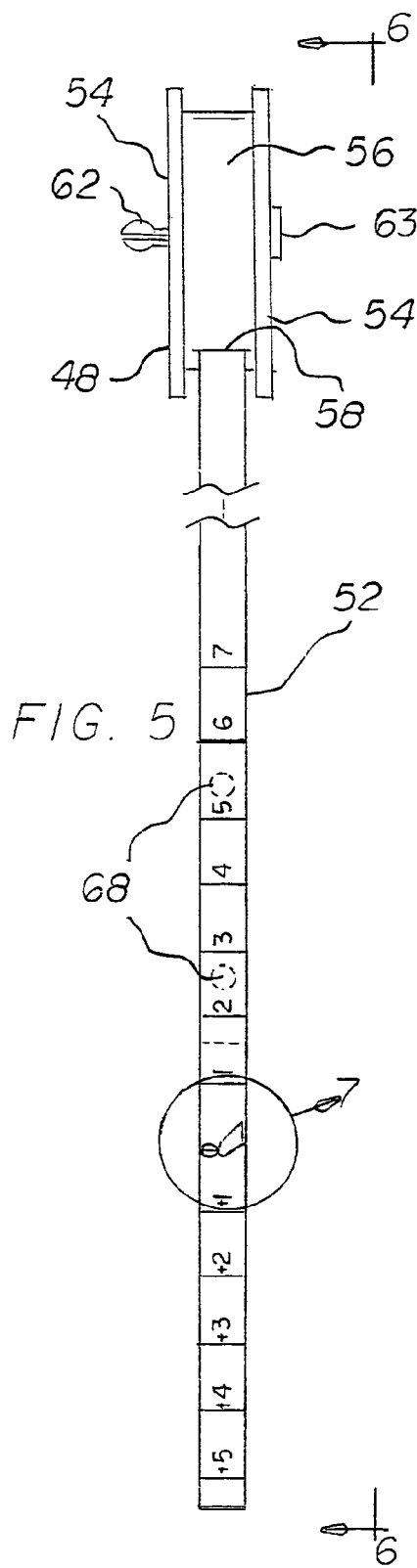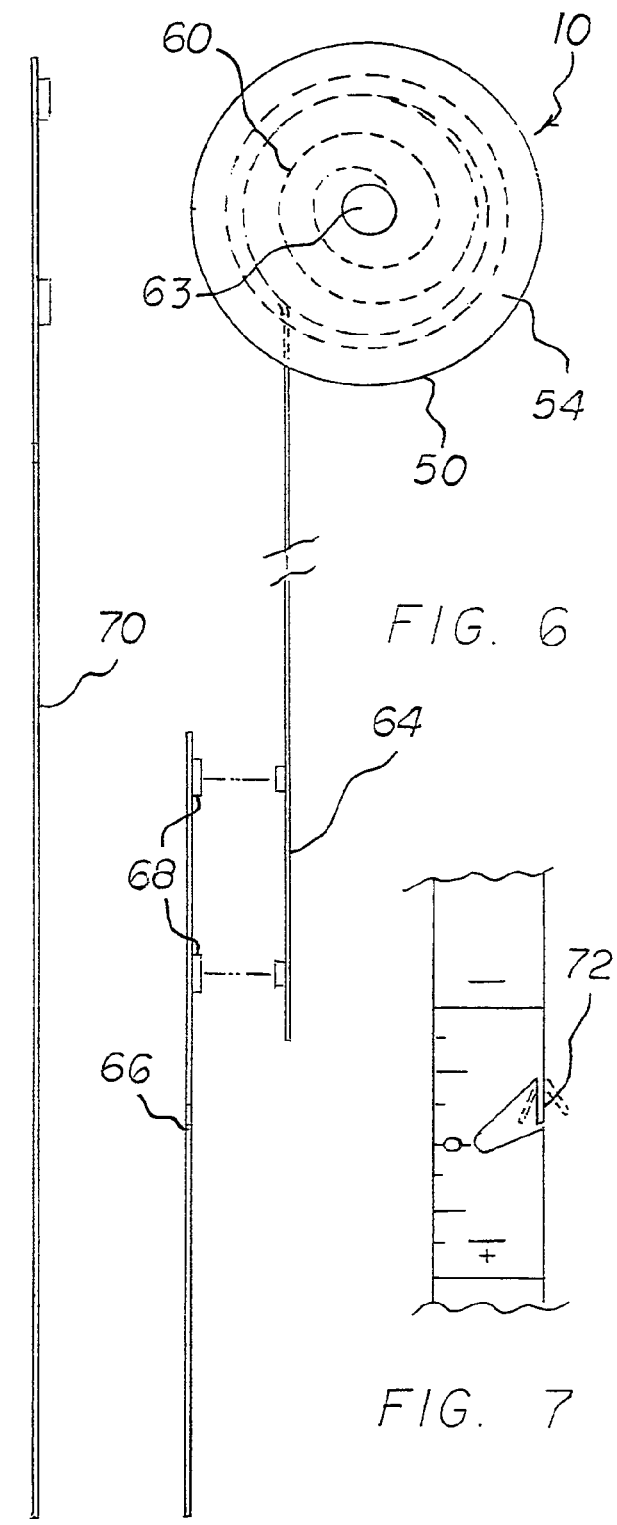
FIG. 5
FIG. 6
FIG. 7

FISH MEASURING SYSTEM

BACKGROUND OF THE INVENTION

Field of the Invention

The present invention relates to a fish measuring system and more particularly pertains to measuring the length and the girth of a fish, the measuring of both the length and the girth being done in a safe, rapid, accurate and economical manner.

SUMMARY OF THE INVENTION

In view of the disadvantages inherent in the known types of measuring systems of known designs and configurations now present in the prior art, the present invention provides an improved fish measuring system. As such, the general purpose of the present invention, which will be described subsequently in greater detail, is to provide a new and improved fish measuring system and method which has all the advantages of the prior art and none of the disadvantages.

To attain this, the present invention essentially comprises a fish measuring system. First provided is a girth measurer. The girth measurer has a fixed assembly and a movable assembly. The fixed assembly includes a generally tubular elongated body with an interior end and an exterior end. A fixed handle at the interior end is adapted to be fixedly held during use. A generally triangular guide is at the exterior end. The guide has a lower extent with closely spaced lateral first and second lower slots. The guide has an upper extent with widely spaced lateral first and second upper slots which extend as extensions from the lower slots.

The movable assembly includes assembly includes a tubular slider reciprocally mounted within the body of the fixed assembly. The slider has an exterior end and an interior end. A block is provided on the exterior end of the slider. A movable handle is provided on the interior end of the slider for movement toward and away from the triangular guide. A strap is provided. Such strap is fabricated of a flexible, inextensible material. The strap has a first end and a second end. The first end passes downwardly through the first upper slot and the first lower slot and is attached to the block. The second end passes downwardly through the second upper slot and the second lower slot and is attached to the block. The strap includes in two parallel sections between the triangular guide and the block. The sections are of varying lengths as a function of the position of the movable handle with respect to the fixed handle. The strap is in a closed loop between the two upper slots. The loop is of varying circumferences as a function of the position of the movable handle with respect to the fixed handle. Opposed parallel first and second surfaces are on the body between the movable handle and the guide. First and second additional surfaces are on the body between the movable handle and the guide with numbers to be read by a user in determining the girth of a fish being measured. The girth of the fish to be measured is positioned in the loop while the loop is enlarged by moving the slider toward the triangular guide. The slider is then moved away from the guide until the strap is in contact with the girth of the fish whereupon the lowermost of the visible numbers represents the girth of the fish being measured.

The length measurer includes a tape measure. The tape measurer includes a housing. The tape measure also includes a tape. The housing is in a cylindrical configuration. The housing has first and second circular end walls. The housing has a cylindrical wall. The cylindrical wall is provided between the end walls. In this manner a chamber is defined. The cylindrical wall has a slot. In this manner tape may pass.

A coil spring is provided within the chamber. A button is provided on the first end wall of the housing of the tape measure. When the button is pressed, the tape is coiled up within the chamber.

A pin is provided on the second end wall of the housing of the tape measure. The pin removably couples the tape measure to the triangular guide. The tape measure is separated from the triangular guide when measuring the length of a fish. The tape measure is also preferably separated from the triangular guide when measuring the girth of a fish.

The tape has an interior section and an exterior section. The interior section has an inner end and an outer end. The inner end is within the chamber adapted to be coiled up and uncoiled by the action of the coil spring or the handle. The exterior section has an inner end and a free outer end. The outer end of the interior section and the inner end of the exterior section have co-operable fasteners for separably coupling the interior and exterior sections. A supplemental exterior section is provided and adapted to couple to the interior section. A "0" marking on the exterior section with the numbers increasing moving away from the housing for measuring the length of the fish rearwardly of the mouth of the fish. The numbers increasing moving toward the housing for measuring the length of the fish forward of the mouth.

Lastly provided is a clip. The clip is removably attached to the tape at the "0" marking. The clip is adapted to receive and support a line, leader or hook while in the mouth of the fish to be measured. The measuring of the fish is achieved by adding the lengths of the fish forward of and rearwardly of the mouth.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fish measuring system which has all of the advantages of the prior art measuring systems of known designs and configurations and none of the disadvantages.

It is another object of the present invention to provide a new and improved fish measuring system which may be easily and efficiently manufactured and marketed.

It is further object of the present invention to provide a new and improved fish measuring system which is of durable and reliable constructions.

An even further object of the present invention is to provide a new and improved fish measuring system which is susceptible of a low cost of manufacture with regard to both materials and labor, and which accordingly is then susceptible of low prices of sale to the consuming public, thereby making such fish measuring system economically available to the buying public.

Even still another object of the present invention is to provide a fish measuring system for measuring the length and the girth of a fish, the measuring of both the length and the girth being done in a safe, rapid, accurate and economical manner.

Lastly, it is an object of the present invention to provide a new and improved fish measuring system. A girth measurer includes a generally tubular elongated body with interior and exterior ends. The girth measurer includes a handle at the interior end. The girth measurer also includes a generally triangular guide at the exterior end. The guide has two upper slots and two lower slots. A slider is reciprocally mounted for movement within the body. A strap is fabricated of a flexible, inextensible material. The strap has first and second ends passing downwardly through the slots and attached to the slider. The strap is in two parallel sections between the triangular guide and the handle. The strap is in a closed loop between the two upper slots. The loop is of varying circumferences as a function of the position of the handle along the body.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a first component of a fish measuring system constructed in accordance with the principles of the present invention.

FIG. 2 is a cross sectional view of the first component taken along line 2-2 of FIG. 1 with the central section broken away and enlarged.

FIG. 5 is a front elevational view of the second component of the system of the present invention.

FIG. 6 is a side elevational view taken along lie 6-6 of FIG. 5.

FIG. 7 is an enlarged showing of a portion of the second component taken at Circle 7 of FIG. 5.

The same reference numerals refer to the same parts throughout the various Figures.

DESCRIPTION OF THE PREFERRED EMBODIMENT

Figure 3:
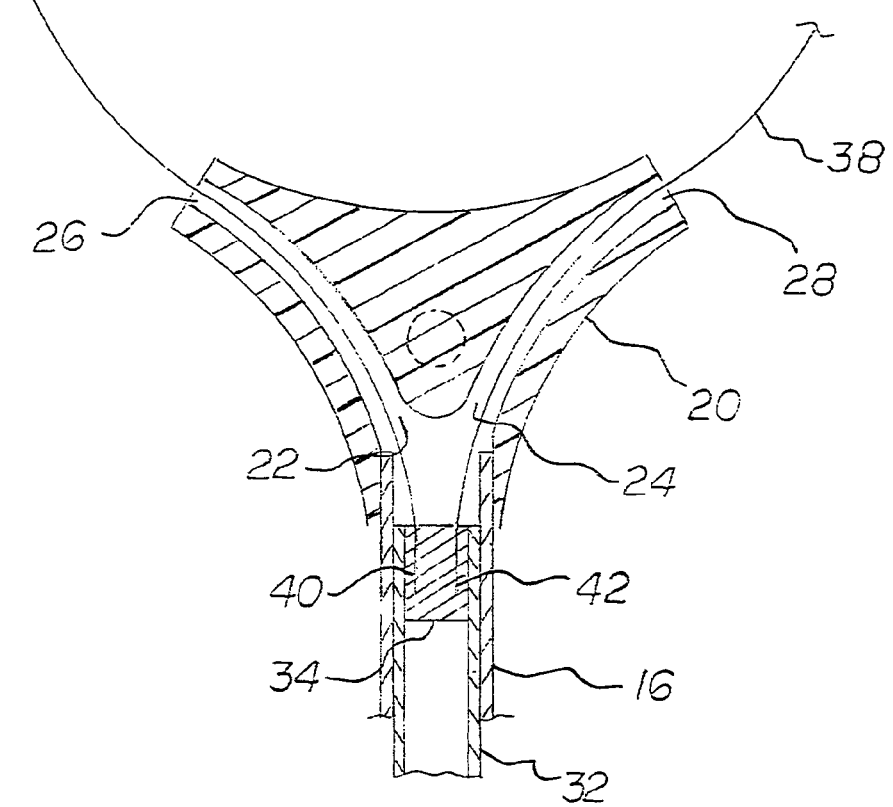
FIG. 3 is a cross sectional view of the first component taken along line 3-3 of FIG. 2.
Figure 4:
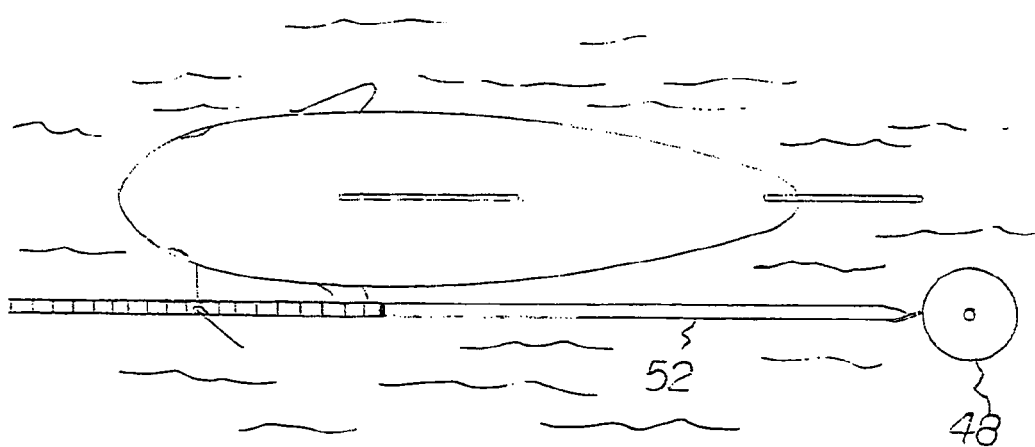
FIG. 4 is a plan view of the system with a fish length being measured.

With reference now to the drawings, and in particular to FIG. 1 thereof, the preferred embodiment of the new and improved fish measuring system embodying the principles and concepts of the present invention and generally designated by the reference numeral 10 will be described.

The present invention, the fish measuring system 10 is comprised of a plurality of components. Such components in their broadest context include a girth measurer and a slider. Such components are individually configured and correlated with respect to each other so as to attain the desired objective.

First provided is a girth measurer 14. The girth measurer has a fixed assembly and a movable assembly. The fixed assembly includes a generally tubular elongated body 16 with an interior end and an exterior end. A fixed handle 18 at the interior end is adapted to be fixedly held during use. A generally triangular guide 20 is at the exterior end. The guide has a lower extent with closely spaced lateral first and second lower slots 22, 24. The guide has an upper extent with widely spaced lateral first and second upper slots 26, 28 which extend as extensions from the lower slots.

The movable assembly includes assembly including a tubular slider 32 reciprocally mounted within the body of the fixed assembly. The slider has an exterior end and an interior end. A block 34 is provided on the exterior end of the slider. A movable handle 36 is provided on the interior end of the slider for movement toward and away from the triangular guide. A strap 40 is provided. Such strap is fabricated of a flexible, inextensible material. The strap has a first end 40 and a second end 42. The first end passes downwardly through the first upper slot and the first lower slot and is attached to the block. The second end passes downwardly through the second upper slot and the second lower slot and is attached to the block. The strap includes in two parallel sections between the triangular guide and the block. The sections are of varying lengths as a function of the position of the movable handle with respect to the fixed handle. The strap is in a closed loop between the two upper slots. The loop is of varying circumferences as a function of the position of the movable handle with respect to the fixed handle. Opposed parallel first and second surfaces 44 are on the body between the movable handle and the guide. First and second additional surfaces 46 are on the body between the movable handle and the guide with numbers to be read by a user in determining the girth of a fish being measured. The girth of the fish to be measured is positioned in the loop while the loop is enlarged by moving the slider toward the triangular guide. The slider is then moved away from the guide until the strap is in contact with the girth of the fish whereupon the lowermost of the visible numbers represents the girth of the fish being measured.

The length measurer includes a tape measure 48. The tape measure includes a housing 50. The tape measure also includes a tape 52. The housing is in a cylindrical configuration. The housing has first and second circular end walls 54. The housing has a cylindrical wall 56. The cylindrical wall is provided between the end walls. In this manner a chamber is defined. The cylindrical wall has a slot 58. In this manner tape may pass.

A coil spring 60 is provided within the chamber. A button 63 is provided on the first end wall of the housing of the tape measure. When the button is pressed, the tape is coiled up within the chamber.

A pin 62 is provided on the second end wall of the housing of the tape measure. The pin removably couples the tape measure to the triangular guide. The tape measure is separated from the triangular guide when measuring the length of a fish. The tape measure is also preferably separated from the triangular guide when measuring the girth of a fish.

The tape has an interior section 64 and an exterior section 66. The interior section has an inner end and an outer end. The inner end is within the chamber adapted to be coiled up and uncoiled by the action of the coil spring or the handle. The exterior section has an inner end and a free outer end. The outer end of the interior section and the inner end of the exterior section have co-operable fasteners 68 for separably coupling the interior and exterior sections. A supplemental exterior section 70 is provided and adapted to couple to the interior section. A "0" marking on the exterior section with increasing numbers moving away from the housing functions for measuring the length of the fish rearwardly of the mouth of the fish. The numbers increase moving toward the housing for measuring the length of the fish forward of the mouth.

Lastly provided is a clip 72. The clip is removably attached to the tape at the "0" marking. The clip is adapted to receive and support a line, leader or hook while in the mouth of the fish to be measured. The measuring of the fish is achieved by adding the lengths of the fish forward of and rearwardly of the mouth.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish measuring system comprising:
    a girth measurer including a generally tubular elongated body with interior and exterior ends, a handle at the interior end, a generally triangular guide at the exterior end, the guide having two upper slots and two lower slots; and
    a slider reciprocal mounted for movement within the body, a strap fabricated of a flexible, inextensible material, the strap having first and second ends passing downwardly through the slots and attached to the slider, the strap being in two parallel sections between the triangular guide and the handle, the strap being in a closed loop between the two upper slots, the loop being of varying circumferences as a function of the position of the handle along the body.

2. The system as set forth in claim 1 wherein the triangular guide has a lower extent with the two lower slots, the guide having an upper extent with the two upper slots extending as extensions from the lower slots.

3. The system as set forth in claim 1 and further including:
    opposed parallel first and second surfaces on the body between the handle and the guide, first and second additional surfaces on the body between the handle and the guide with numbers to be read by a user in determining the girth of a fish being measured.

4. The system as set forth in claim 1 and further including:
    a length measurer including a housing and a tape, the housing being in a cylindrical configuration with first and second circular end walls and a cylindrical wall between the end walls thereby defining a chamber there within, the cylindrical wall having a slot for the passage of the tape; and
    the tape having an interior section and an exterior section, the interior section having an inner end and an outer end with the inner end being within the chamber adapted to be coiled up and uncoiled, the exterior section having an inner end and a free outer end, the outer end of the interior section and the inner end of the exterior section having co-operable fasteners for separably coupling the interior and exterior sections, a "0" marking on the exterior section with increasing numbers moving away from the housing for measuring the length of a fish rearwardly and with increasing numbers moving toward the housing for measuring the length of the fish forwardly.

5. The system as set forth in claim 4 and further including a clip removably attached to the tape at the "0" marking, the clip adapted to receive and support a line, leader or hook while in a mouth of the fish to be measured, the measuring of the fish being achieved by adding the lengths of the fish forward of and rearwardly of the mouth.

6. A fish measuring system (10) for measuring the length and the girth of a fish, the measuring of both the length and the girth being done in a safe, rapid, accurate and economical manner, the system comprising, in combination:
    a girth measurer (14) having a fixed assembly and a movable assembly, the fixed assembly including a generally tubular elongated body (16) with an interior end and an exterior end, a fixed handle (18) at the interior end adapted to be fixedly held during use, a generally triangular guide (20) at the exterior end, the guide having a lower extent with closely spaced lateral first and second lower slots (22), (24), the guide having an upper extent with widely spaced lateral first and second upper slots (26), (28) extending as extensions from the lower slots;
    the movable assembly including a tubular slider (32) reciprocally mounted within the body of the fixed assembly, the slider having an exterior end and an interior end, a block (34) on the exterior end of the slider, a movable handle (36) on the interior end of the slider for movement toward and away from the triangular guide, a strap (38) fabricated of a flexible, inextensible material, the strap having a first end (40) and a second end (42), the first end passing downwardly through the first upper slot and the first lower slot and attached to the block, the second end passing downwardly through the second upper slot and the second lower slot and attached to the block, the strap being in two parallel sections between the triangular guide and the block, the sections being of varying lengths as a function of the position of the movable handle with respect to the fixed handle, the strap being in a closed loop between the two upper slots, the loop being of varying circumferences as a function of the position of the movable handle with respect to the fixed handle, opposed parallel first and second surfaces (44) on the body between the movable handle and the guide, first and second additional surfaces (46) on the body between the movable handle and the guide with numbers to be read by a user in determining the girth of a fish being measured, the girth of the fish to be measured being positioned in the loop while the loop is enlarged by moving the slider toward the triangular guide whereafter the slider is moved away from the guide until the strap is in contact with the girth of the fish whereupon the lowermost of the numbers which are visible represents the girth of the fish being measured;

a length measurer including a tape measure (48), the tape measure including a housing (50) and a tape (52), the housing being in a cylindrical configuration with first and second circular end walls (54) and a cylindrical wall (56) between the end walls thereby defining a chamber there within, the cylindrical wall having a slot (58) for the passage of the tape;

a coil spring (60) within the chamber, a button (63) on the first end wall of the housing of the tape measure whereby when the button is pressed, the tape is coiled up within the chamber;

a pin (62) on the second end wall of the housing of the tape measure, the pin removably coupling the tape measure to the triangular guide, the tape measure adapted to be separated from the triangular guide when measuring the length of a fish and when measuring the girth of a fish;

the tape having an interior section (64) and an exterior section (66), the interior section having an inner end and an outer end with the inner end being within the chamber adapted to be coiled up and uncoiled by the action of the coil spring or the handle, the exterior section having an inner end and a free outer end, the outer end of the interior section and the inner end of the exterior section having co-operable fasteners (68) for separably coupling the interior and exterior sections, a supplemental exterior section (70) adapted to couple to the interior section, a "0" marking on the exterior section with the numbers increasing moving away from the housing for measuring the length of the fish rearwardly of a mouth of the fish and with the numbers increasing moving toward the housing for measuring the length of the fish forward of the mouth; and a clip (72) removably attached to the tape at the "0" marking, the clip adapted to receive and support a line, leader or hook while in the mouth of the fish to be measured, the measuring of the fish being achieved by adding the lengths of the fish forward of and rearwardly of the mouth.

* * * * *